June 24, 1930.  L. B. HARRIS  1,767,757
VEHICLE SEAT
Filed Feb. 27, 1928
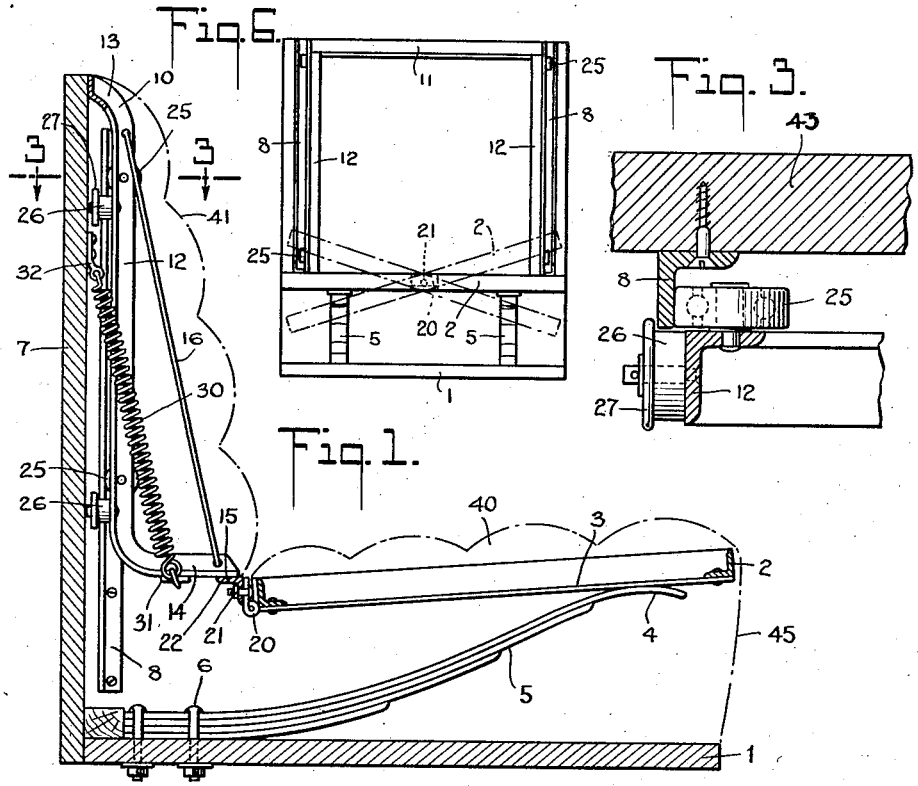

Patented June 24, 1930

1,767,757

UNITED STATES PATENT OFFICE

LEONARD B. HARRIS, OF NEW YORK, N. Y., ASSIGNOR OF ONE-HALF TO EDGAR M. GOLDSMITH, OF NEW YORK, N. Y.

VEHICLE SEAT

Application filed February 27, 1928. Serial No. 257,192.

My invention relates to an improved seat for use in vehicles. The advantages of the invention are fully understood in considering its use in a motor vehicle, as here explained, although it is also adapted or adaptable for use in other vehicles, including railway cars.

The general object is to provide a spring support embodied in the seat itself and which is therefore supplemental to the springs of the vehicle proper, thus affording greatly increased comfort to passengers.

A particular object is to avoid friction of the passenger's back or of his garments upon the back-rest or rear cushion of the seat, such as occurs in the use of ordinary seat structures, and results in creasing or crumpling and wear of garments and discomfort to the passenger.

To realize these and other objects the invention in a practical embodiment, as here shown, includes a spring-supported seat proper, and a movably supported backrest having an articulated connection with the seat, so that the back-rest moves in a generally vertical direction, substantially in accordance with the movement of the seat and therefore maintains a stable or non-frictional contact with the back or back garments of the passenger.

The characteristics and advantages of the invention are further sufficiently explained in connection with the following detail description of the accompanying drawings, which illustrate certain representative embodiments. After considering these examples, skilled persons will understand that many variations may be made without departing from the principles involved, and I contemplate the employment of any structures that are properly within the scope of the appended claim.

Fig. 1 is a vertical section of a seat structure embodying the invention in one form.

Fig. 2 is a fragmentary plan view, with cushions omitted.

Fig. 3 is a fragmentary section, enlarged, at 3—3, Fig. 1.

Fig. 4 is a detail, in vertical section, of a modification.

Fig. 5 is a sectional detail, enlarged, at 5—5, Fig. 4.

Fig. 6 is a diagrammatic partial front elevation, explaining the tilting movement of the seat in its vertical plane.

In Fig. 1, 1 is any suitable base which might in some cases be a portion of the vehicle floor; otherwise it is a baseboard constituting a part of the seat structure, and which may be provided with any suitable means for movable or fixed connection to the floor of the vehicle. The seat proper includes a frame 2 of generally rectangular form, which may be composed of one or more strips of metal of angle section. At the bottom of this frame are spaced longitudinal strips 3 which have sliding contact with the curved ends 4 of springs 5, which are desirably, as shown, multiple leaf springs having leaves of graduated lengths, to give substantially uniform deflection, the fixed ends of the leaves being anchored by U-bolts 6 to the base 1.

A back-board, or vertical support, 7 is connected at its lower end to the base 1 and on this support are secured vertical guides, in the form of angle strips 8 and 9, for a back frame 10. This frame comprises an upper transverse member 11, side members 12 having curved upper ends 13 connected to or integral with the transverse member 11, and also having horizontally bent lower portions 14, the ends of which are connected by a lower transverse front member 15. The bent lower ends 14 may also be supported in relation to the upright members, by brace rods 16.

The seat frame is connected to the backframe by a combined hinge and trunnion joint, including the hinge 20, one member of which is connected to the rear transverse member of the seat frame at the center thereof, and the other member is connected by a pivot or trunnion 21 to a bracket 22, this bracket being connected to the lower transverse member 15 of the back-frame at the center thereof. The back-frame is slidably guided on the guide strips 8 by upper and lower rollers 25 engaging the front faces of the strips, and other upper and lower rollers 26 engaging the edges of the strips, these rollers also having flanges 27 overlapping the rear edges of the strips, this combined roller arrangement preventing any displacement of the back-frame from vertical position. The back-frame and the rear portion of the seat frame are yiedably supported by suitable springs, such as the long helical springs 30 connected to eyes 31 on members 14 of the back-frame, and other eyes 32 secured to the back support 7. Each main seat portion, that is, the seat frame proper and the back-frame, is provided with a suitable cushion such as 40 and 41 respectively, as sufficiently indicated in dotted lines, these cushions being padded in the usual manner and the covering being brought over the outer faces of the respective frame members and secured in any known or suitable way. Especially the side portions of the back cushion cover 41 are brought outside the outer faces of the vertical frame members 12 and there secured, so that the cushion moves with the back-frame. The ends of the back cushion are desirably enclosed or housed by side boards 43, and certain vertical guide strips such as 8 may be secured to the inner faces of the side boards. The front cushion cover portion 45 may be brought down and secured to the front edge of the base 1 as clearly shown in Fig. 1 thus providing concealment for the springs 5 and other internal structural features.

I have above described a single complete seat structure, that is, one consisting principally of a seat frame and a cooperating back-frame. Fig. 2, however, indicates that two such complete seat structures may be embodied in a single support or frame; that is, two of the seat frames and back-frames are arranged side by side to provide for the seating of a greater number of passengers in a row, and for the more independent or flexible spring support of such a plurality of passengers.

Considering a single complete structure, that is, one comprising a single seat frame and back-frame with other appurtenances, it is evident that any different weights, as of two passengers of different weights sitting on the different ends of the seat cushion 40, will be accommodated by the flexible tilting of the seat frame upon its trunnion 21, as best shown in Fig. 6. As the vehicle passes over irregular surfaces the resulting movement of the base 5 causes deflection of the seat-supporting springs 5 in proportion to the loads imposed upon them, or in other words the seat moves resiliently to yieldingly and easily support the passengers and with a lateral tilting movement at the trunnion 21 proportional to the passengers' weights; at the same time the back cushion with the back-frame 12 move vertically in accordance with the movement of the rear edge of the seat frame, so that the backs of the passengers or the backs of their garments in contact with the cushion have no frictional or sliding movement, and wear of garments or discomfort to passengers ordinarily occasioned by such sliding friction are entirely eliminated.

The hinge connection 20 provides mainly for deflection of the forward portion of the seat frame in relation to the back-frame, and the contact of the longitudinal strips 3 with the curved ends of spring 5 permits the necessary slight relative sliding movement of the seat frame upon the springs. The springs 30 provide for the resilient support and normal retention of the back-frame and the rear portion of the seat frame in upward position, as well as contributing to the resilient support of the passengers while the vehicle is in motion.

Figs. 4 and 5 show a modification in which the vertical guides for the back-frame consist of strips 50 of open channel section. By the use of such guide channels the back-frame members 12 are guided by single upper and lower rolls 51, the pintles 52 of which are secured to the back-frame members. The rolls running in the channels guide the back-frame for vertical movement and prevent any lateral or longitudinal displacement in an obvious way.

What I claim is:

A seat structure of the class described comprising a base, a back support, multiple cantilever leaf springs connected near the rear of the base and extending forward, a seat frame having steel re-enforcing strips running longitudinally thereof and adapted to rest on a forward portion of said leaf springs, a back frame having pairs of antifriction rollers providing for vertical sliding movement in relation to the rear support and including angularly bent side members the lower ends of which lie in substantially the same plane as the plane of said seat frame, springs tending to support the back frame, and a combined horizontal pivot and vertical hinge connection between a rear part of the seat frame and a tie piece joining the ends of the angularly disposed portions of the side members.

Signed at New York city, in the county of New York and State of New York, this 10th day of January, A. D. 1928.

LEONARD B. HARRIS.